US009160437B2

United States Patent
Ajima et al.

(10) Patent No.: US 9,160,437 B2
(45) Date of Patent: Oct. 13, 2015

(54) WIRELESS COMMUNICATION DEVICE AND WIRELESS COMMUNICATION METHOD

(71) Applicant: KYOCERA CORPORATION, Kyoto (JP)

(72) Inventors: Hiromi Ajima, Kanagawa (JP); Toru Sahara, Kanagawa (JP); Minako Kitahara, Kanagawa (JP); Tomohiro Suzuki, Kanagawa (JP); Keisuke Sanagi, Kanagawa (JP); Shunsaku Kikuchi, Kanagawa (JP); Takashi Matsumura, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/372,821

(22) PCT Filed: Jan. 15, 2013

(86) PCT No.: PCT/JP2013/050539
§ 371 (c)(1),
(2) Date: Jul. 17, 2014

(87) PCT Pub. No.: WO2013/108742
PCT Pub. Date: Jul. 25, 2013

(65) Prior Publication Data
US 2015/0023453 A1 Jan. 22, 2015

(30) Foreign Application Priority Data
Jan. 18, 2012 (JP) .................. 2012-007630

(51) Int. Cl.
*H04L 27/06* (2006.01)
*H04B 7/08* (2006.01)
(Continued)

(52) U.S. Cl.
CPC ............... *H04B 7/0834* (2013.01); *H04B 1/10* (2013.01); *H04B 7/0413* (2013.01);
(Continued)

(58) Field of Classification Search
CPC ...... H04B 7/0834; H04B 7/0413; H04B 1/10; H04B 7/0452; H04B 7/0456; H04B 7/0857; H04B 7/0854; H04B 7/068; H04B 7/0671; H04B 7/0678; H04B 7/0669; H04L 25/0202
USPC ........................................ 375/340
See application file for complete search history.

(56) References Cited

U.S. PATENT DOCUMENTS 6,496,144 B2 * 12/2002 Tanaka et al. ................. 342/378
8,284,875 B2 * 10/2012 Park et al. ..................... 375/341
(Continued)

FOREIGN PATENT DOCUMENTS

JP  2002-141846 A   5/2002
JP  2006-270730 A   10/2006
(Continued)

OTHER PUBLICATIONS

International Search Report; PCT/JP2013/050539; Feb. 12, 2013.
(Continued)

Primary Examiner — Dhaval Patel
(74) Attorney, Agent, or Firm — Studebaker & Brackett PC

(57) ABSTRACT

A wireless communication device includes:
a plurality of antennas receiving signals transmitted from one or more transmission antennas;
a synthesis calculation unit performing a synthesis calculation of respective reception signals received by the plurality of antennas and reception weights corresponding to respective antenna ports;
a channel estimation unit calculating respective estimated channel values from respective synthesized signals obtained by the synthesis calculation for the respective antenna ports, and
a decoding unit performing decoding from the respective estimated channel values and the synthesized signals for the respective antenna ports.

9 Claims, 6 Drawing Sheets

(51) Int. Cl.
*H04B 7/04* (2006.01)
*H04B 1/10* (2006.01)
*H04L 25/02* (2006.01)
*H04B 7/06* (2006.01)

(52) U.S. Cl.
CPC ........... *H04B 7/0456* (2013.01); *H04B 7/0854* (2013.01); *H04B 7/0857* (2013.01); *H04L 25/0202* (2013.01); *H04B 7/068* (2013.01); *H04B 7/0669* (2013.01); *H04B 7/0671* (2013.01); *H04B 7/0678* (2013.01)

(56) References Cited

U.S. PATENT DOCUMENTS

| | | |
|---|---|---|
| 2002/0050948 A1 | 5/2002 | Tanaka et al. |
| 2006/0217075 A1 | 9/2006 | Sunaga et al. |
| 2008/0293371 A1* | 11/2008 | Kishigami et al. ......... 455/278.1 |
| 2010/0046445 A1 | 2/2010 | Sawahashi et al. |
| 2011/0090975 A1* | 4/2011 | Al-Naffouri et al. ......... 375/260 |
| 2011/0103324 A1* | 5/2011 | Nam et al. ..................... 370/329 |
| 2011/0261872 A1* | 10/2011 | Wang et al. ................... 375/227 |

FOREIGN PATENT DOCUMENTS

| | | |
|---|---|---|
| JP | 4396853 B2 | 10/2009 |
| JP | 2009-273186 A | 11/2009 |

OTHER PUBLICATIONS

Mamoru Sawahashi et al., "Multi Antenna Musen Gijutsu Sono 1 Multi Antenna Musen Denso Gijutsu no Gaiyo", NTT DoCoMo Technical Journal, vol. 13, No. 3, The Telecommunications Association, 2005.10, p. 68; with concise statement of Non-patent Literature.

* cited by examiner

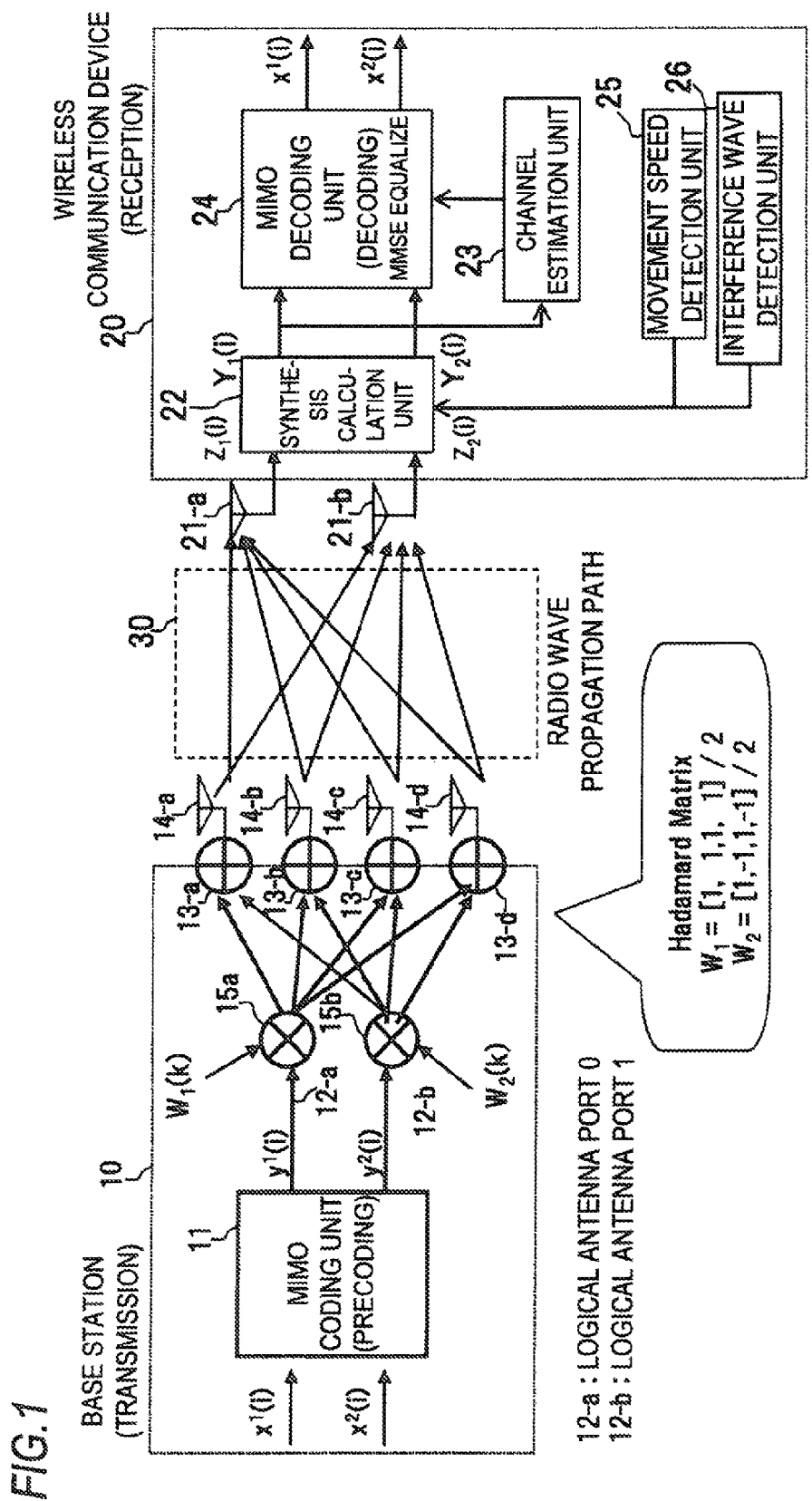

WIRELESS COMMUNICATION DEVICE AND WIRELESS COMMUNICATION METHOD

TECHNICAL FIELD

The present invention relates to a wireless communication device and a wireless communication method performing wireless communication.

BACKGROUND ART

As a communication device implementing an Adaptive array Antenna System (AAS), a communication device using a multiple input multiple output (MIMO) has been proposed (for example, refer to Patent Literature 1).

Also, as a transmission method of the AAS communication device, a method of selecting an AAS method and a MIMO method has been proposed (for example, refer to Patent Literature 2). This method estimates the orthogonality of a channel characteristic between transmission and reception antennas to determine and switch which of the adaptive array antenna system and the MIMO has an advantage. Also, Patent Literature 2 discloses an example of a base station and propose a transmission method for a downlink.

In the communication device using the MIMO, a method of using a channel characteristic H between transmission and reception antennas has been known. For example, a Zero Forcing (ZF) equalization method and a Minimum Mean Square Error (MMSE) equalization method are examples of the method of using the channel characteristic H.

CITATION LIST

Patent Literatures

Patent Literature 1: Japanese Patent Application Registration No. 4396853B
Patent Literature 2: Japanese Patent Application Publication No. 2006-270730A.

SUMMARY

Technical Problem

However, in these MIMO methods, although an interference removal between a plurality of layers (also referred to as streams) of the channel characteristic is considered, an interference signal from another wireless communication system is not considered. While the ZF equalization method and the MMSE equalization method favorably operate in case that there is no interference from another wireless communication system, they are highly influenced when there is the interference from another wireless communication system.

In view of the above situations, an object of the present invention is to provide a wireless communication device and a wireless communication method capable of suppressing interference from another wireless communication system to thus improve a reception signal characteristic, as compared to the related art.

Solution to Problem

A wireless communication device of the present invention includes a plurality of antennas receiving signals transmitted from one or more transmission antennas; a synthesis calculation unit performing a synthesis calculation of respective reception signals received by the plurality of antennas and reception weights corresponding to respective antenna ports; a channel estimation unit calculating respective estimated channel values from respective synthesized signals obtained by the synthesis calculation for the respective antenna ports, and a decoding unit performing decoding from the respective estimated channel values and the synthesized signals for the respective antenna ports.

In the wireless communication device of the present invention, the reception signal may include a reference signal, which is different for the respective antenna ports, respective reference signals being located at a frequentially-and-temporally same position, or the reception signal may include a reference signal corresponding to one antenna port.

The wireless communication device of the present invention may further include an interference wave detection unit detecting a magnitude of an interference wave of the reception signal, and the synthesis calculation unit may perform the synthesis calculation, in response to the magnitude of the interference wave.

The wireless communication device of the present invention may further include a movement speed detection unit detecting a movement speed of the wireless communication device, and the synthesis calculation unit may perform the synthesis calculation, in response to the movement speed of the wireless communication device.

In the wireless communication device of the present invention, when the signal transmitted from the transmission antenna is a Space Frequency Block Coding (SFBC), the synthesis calculation unit may not perform the synthesis calculation if a level of the interference wave is a predetermined level or lower.

In the wireless communication device of the present invention, when the signal transmitted from the transmission antenna is a Large Delay CDD (Cyclic Delay Diversity) or SFBC, the synthesis calculation unit may not perform the synthesis calculation if the movement speed of the wireless communication device is a predetermined level or higher.

In the wireless communication device of the present invention, the reception signal may include a reference signal, which is different for the respective antenna ports, and when respective reference signals is located at a frequentially-and-temporally different position, the synthesis calculation unit may not perform the synthesis calculation if the movement speed of the wireless communication device is a predetermined level or higher.

A wireless communication method of the present invention includes a step of performing a synthesis calculation of respective reception signals received by a plurality of antennas receiving signals transmitted from one or more transmission antennas and reception weights corresponding to respective antenna ports, according to a predetermined condition; a step of calculating respective estimated channel values from respective synthesized signals obtained by the synthesis calculation for the respective antenna ports, and a step of performing decoding from the respective estimated channel values and the synthesized signals for the respective antenna ports.

In the wireless communication method, the step of performing the synthesis calculation, the step of calculating the estimated channel values and the step of performing the decoding may be performed in that order.

A wireless communication device of the present invention includes a plurality of antennas receiving signals transmitted from one or more transmission antennas, and a controller. The controller may perform a synthesis calculation of respective reception signals received by the plurality of antennas and reception weights corresponding to respective antenna ports;

find respective estimated channel values from respective synthesized signals for the respective antenna ports, and perform decoding from the respective estimated channel values and the synthesized signals for the respective antenna ports.

Effects of the Present Invention

The wireless communication device and wireless communication method of the present invention can suppress interference from another wireless communication system to thus improve a reception signal characteristic, as compared to the related art.

BRIEF DESCRIPTION OF THE DRAWINGS

FIG. 1 is a configuration view of a wireless communication system according to an illustrative embodiment of the present invention.

DETAILED DESCRIPTION OF ILLUSTRATIVE EMBODIMENTS

Figure 2A:
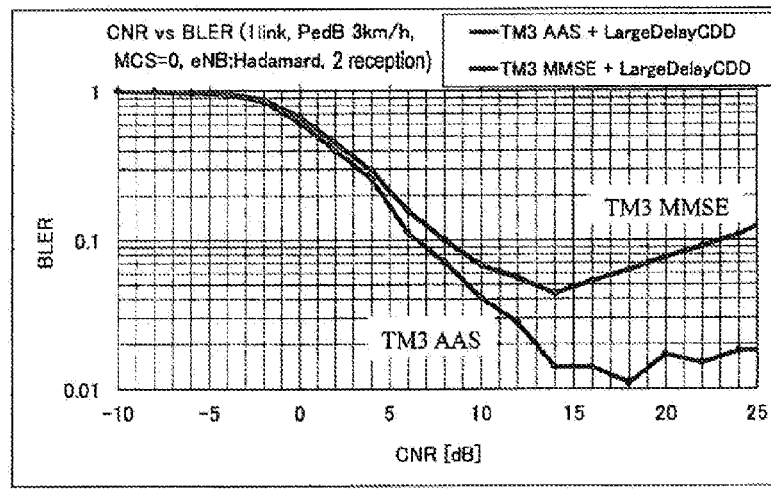
FIGS. 2A, 2B and 2C show relations between a block error ratio and a carrier noise ratio for the case of TM3 by simulations.

Hereinafter, an illustrative embodiment of the present invention will be described with reference to the drawings.

FIG. 1 is a configuration view of a wireless communication system according to an illustrative embodiment of the present invention. As shown in FIG. 1, the wireless communication system is configured by a base station 10 and a wireless communication device 20. In order to simplify the descriptions, it is assumed that the base station 10 has four antennas and the wireless communication device 20 has two antennas. That is, the wireless communication system is an example where the number of streams St=2, the number of transmission antennas Nt=4 and the number of reception antennas Nr=2 and uses a logical antenna port 0 (12-a) and a logical antenna port 1 (12-b).

The wireless communication system is configured so that the base station 10 transmits a signal by an MIMO method, and the wireless communication device 20 receives the transmitted signal. The wireless communication system is based on an LTE standard of 3GPP and TM3 (Transmission Mode 3). The TM3 is one of open loop MIMOs also referred to as Large Delay CDD (Cyclic Delay Diversity).

In the below, Transmission Modes 1 to 8 used for the 3GPP are abbreviated as TM1 to TM8. The wireless communication system is mainly described with reference to the TM1, TM2, TM3 and TM4 (refer to standards 3GPP TS 36.213 and the like of the 3GPP). The base station 10 has a MIMO coding unit 11, multipliers 15a, 15b, adders 13a to 13d and antennas 14a to 14d.

The MIMO coding unit 11 is input with stream data x(i) from two routes, and the MIMO coding unit 11 performs precoding of the respective data and outputs through the respective antenna ports 0, 1. Each of the multipliers 15a, 15b performs a calculation by multiplying a predetermined weight and an input signal and outputs the calculated signal to the respective adders 13a to 13d. Meanwhile, the MIMO coding unit 11 performs the pre-coding for Large Delay CCD and then performs mapping of a reference signal for channel estimation.

The adders 13a to 13d are configured to transmit the respective calculated signals through the antennas 14a to 14d.

The wireless communication device 20 is configured by antennas 21a, 21b, a synthesis calculation unit 22, a channel estimation unit 23, a MIMO decoding unit 24, an interference wave detection unit 26 and a movement speed detection unit 25. In the meantime, any one of the synthesis calculation unit 22, the channel estimation unit 23, the MIMO decoding unit 24, the interference wave detection unit 26 and the movement speed detection unit 25 may be configured as a part of functions of a controller.

The antennas 21a, 21b are configured to receive signals transmitted from one or more transmission antennas through a radio wave propagation path 30.

The synthesis calculation unit 22 is configured to perform synthesis calculation of the respective reception signals received by the antennas 21a, 21b and a reception weights corresponding to the respective antennas. Specifically, the synthesis calculation unit 22 receives the signals at the antenna 21 and performs AAS synthesis with associating the same with the respective logical antenna ports.

The channel estimation unit 23 is configured to calculate estimated channel values from the synthesized signals obtained by the synthesis calculation for each logical antenna port. Specifically, the channel estimation unit 23 performs the channel estimation for each logical antenna port by using a reference signal part of the synthesized signal.

Additionally, the reception signal includes a reference signal, which is different for each logical antenna port, and respective reference signals is located at a frequentially-and-temporally same position, or the reception signal includes a reference signal corresponding to one antenna port.

The MIMO decoding unit 24 is configured to perform decoding from the estimated channel values and the synthesized signals for each logical antenna port. Specifically, the MIMO decoding unit 24 MIMO-decodes the signals synthesized for each logical antenna port while combining the logical antenna ports 0, 1.

In the meantime, the MIMO decoding unit 24 may perform the decoding by a linear calculation such as ZF (Zero forcing) equalization, MMSE equalization, Singular Value Decomposition (SVD) of a channel response and the like.

Here, the reception signal is denoted with a vector Z(i) and the AAS synthesized signal is denoted with Y. When the signal Y includes an interference wave component, the interference wave component is suppressed by the AAS synthesis. Further, the MIMO decoding is performed by the MIMO decoding unit 24. A case is considered in which an estimated channel value calculated from the AAS synthesized signal is denoted with H and the MIMO decoding unit 24 performs the MMSE channel equalization.

Here, an MMSE weight is as follows, from an equation of the MMSE channel equalization.

$$W_{mmse} = \hat{H}^H \{\hat{H}\hat{H}^H + NI\}^{-1} \quad \text{[equation 1]}$$

$\hat{H}$: estimated value of a channel matrix
$^H$: Hermitian transpose
N: noise power
I: unit matrix Data S=Wmmse×Y after the MMSE equalization becomes separated data of the MIMO. In the meantime, the MIMO decoding unit 24 performs the decoding in conformity to a modulation method and the like so as to calculate the stream data x(i) from the data S after the equalization.

The interference wave detection unit 26 is configured to detect a magnitude of an interference wave of the reception signal. Here, a method of detecting the interference wave is described.

The interference wave is classified into a correlativity interference wave and a non-correlativity interference wave, based on existence or non-existence of a correlativity with a desired wave.

The correlativity interference wave is a wave (a delay wave or multiple wave) that is emitted from the same wave source as the desired wave and is transmitted through a radio wave propagation path different from the desired wave, the detecting method thereof takes a correlation (self correlation) between a signal of the reference signal part received before the AAS synthesis and a known reference signal to thus estimate a delay, a phase and an amplitude of an incoming signal. A wave having a large delay is detected as the interference wave (delay wave).

The non-correlativity interference wave is a radio wave emitted from a separate wave source from the desired wave, or a delay wave (multiple wave) having a sufficiently long propagation delay and does not have a correlativity with the desired wave. The non-correlativity interference wave is detected by calculating reception power of the signal of the reference signal part received before the AAS synthesis and subtracting the found power from the amplitude of the correlativity interference wave described in the above to thus calculate power of the non-correlativity interference wave. In the meantime, since there is an internal noise such as thermal noise in the communication device, the internal noise is pre-calibrated and thus removed in advance.

The movement speed detection unit 25 is configured to detect a movement speed of the wireless communication device 20. Here, a method of detecting the movement speed is described.

When a position detection system by a GPS is mounted on the wireless communication device 20, it is possible to obtain the movement speed by the position information from the GPS. Also, the other method of detecting the movement speed includes a method of converting the position information into speed information by an accelerator sensor and a method of detecting a Doppler frequency of the reception signal to thus obtain speed information.

Also, the synthesis calculation unit 22 is configured not to perform the synthesis calculation, in response to a magnitude of the interference wave. When the magnitude of the interference wave is small, the synthesis calculation unit 22 does not perform the synthesis calculation. When the magnitude of the interference wave is large, the synthesis calculation unit 22 performs the synthesis calculation. The synthesis calculation unit 22 may determine whether or not to perform the synthesis calculation by comparing the magnitude of the interference wave and a predetermined threshold value.

Further, the synthesis calculation unit 22 is configured not to perform the AAS synthesis calculation, in response to the movement speed of the wireless communication device 20. When the movement speed is small, the synthesis calculation unit 22 performs the synthesis calculation, and when the magnitude of the interference wave is large, the synthesis calculation unit 22 does not perform the synthesis calculation. The synthesis calculation unit 22 may determine whether or not to perform the synthesis calculation by comparing the movement speed and a predetermined threshold value. In the meantime, the synthesis calculation unit 22 may or may not perform the AAS synthesis calculation, based on acceleration information, not the speed information.

In case that the AAS synthesis is not necessary, the processing of the synthesis calculation unit 22 in FIG. 1 is skipped over and the channel estimation is made without AAS synthesizing of the signals received by the antenna 21.

Here, a case where the synthesis calculation unit 22 does not perform the AAS synthesis is described. In the meantime, a case where an SFBC is used is here described.

FIG. 2 shows a relation between a block error ratio and a carrier noise ratio for the case of TM3 by simulations.

A lower polygonal line indicates a case where the AAS synthesis and the MMSE equalization are performed, and an upper polygonal line indicates a case where only the MMSE equalization is performed.

FIG. 2A shows a case where there is no interference wave (1 link) and the movement speed of the wireless communication device 20 is 3 km/h. In a case where BLER (Block Error Rate) equal to 0.1, the AAS synthesis (the lower polygonal line) has a value smaller by 1.5 dB, i.e., it can be said that the CNR value is improved by 1.5 dB, as compared to the case where there is no AAS synthesis (the upper polygonal line).

Figure 2B:
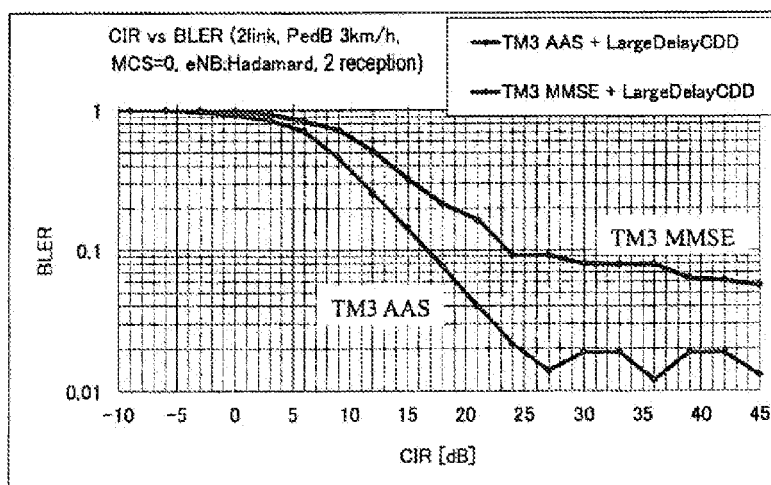

FIG. 2B shows a case where there is an interference wave (the number of interference wave is 1) and the movement speed of the wireless communication device 20 is 3 km/h. In a case where BLER is equal to 0.1, the CIR value about the AAS synthesis (the lower polygonal line) is smaller by 7.0 dB, i.e., it can be said that the CNR value is improved by 7.0 dB, as compared to the case where there is no AAS synthesis (the upper polygonal line).

Figure 2C:
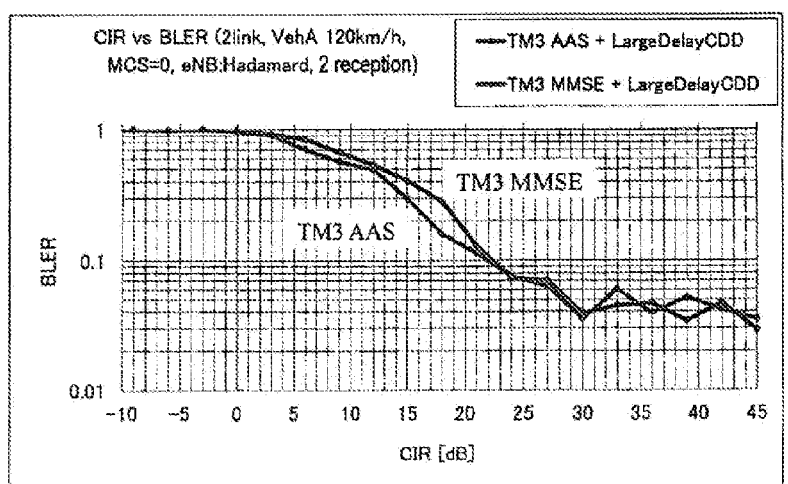

FIG. 2C shows a case where there is an interference wave (the number of interference wave is 1) and the movement speed of the wireless communication device 20 is 120 km/h. In a case where BLER is equal to 0.1, the CIR value about the AAS synthesis (the lower polygonal line) is smaller by 0.5 dB, i.e., it can be said that the CNR value is improved by 0.5 dB, as compared to the case where there is no AAS synthesis (the upper polygonal line, the lower polygonal line around 33 dB and 39 dB).

According to the simulation results shown in FIG. 2, it can be said that an effect of the AAS synthesis is small in the case where there is no interference wave (1 link).

In the above simulations, it is assumed that the interference wave is suppressed by the AAS synthesis. When there is no interference wave, there is nothing to be suppressed. Therefore, it is natural that the above case has little effect. Although the improvement of 1.5 dB is made, this is because the two logical antenna ports are used in the TM3, so that the one antenna port operates with the desired wave and the other antenna port operates with the interference wave. However, the effect is little.

Meanwhile, Port 0 and Port 1 are used as the logical antenna ports in the TM3. However, since the positions of the reference signals are different in the ports, the AAS synthesis is applied, so that there is ingenuity to make the reference signals of the received signals overlap with each other as described above.

FIG. 3 shows a relation between a block error ratio and a carrier noise ratio for the case of TM7 by simulations.

In the TM7, the number of streams is two and the number of transmission antennas is four in the base station 10 of FIG. 1, and the wireless communication device 20 has the two antennas, receives the signals with the AAS, and performs the channel estimation and the channel equalization by using the received signals.

The logical antenna port that is used in the TM7 is one (Port 5). Therefore, the overlapping of the different reference signals, like in the TM3, is not necessary.

A lower polygonal line indicates a case where the AAS synthesis and the MMSE equalization are performed and an upper polygonal line indicates a case where an MRC synthesis is performed.

Figure 3A:
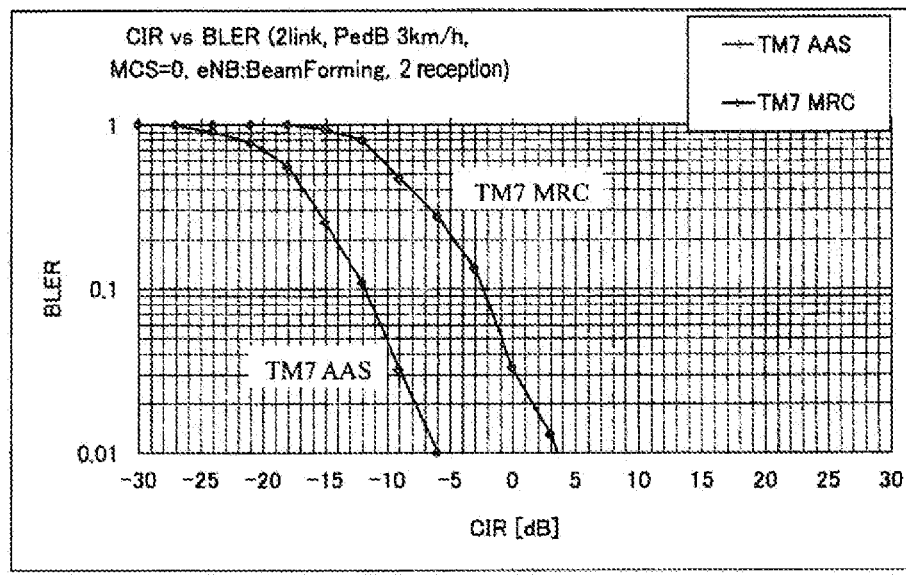
FIGS. 3A and 3B show relations between a block error ratio and a carrier noise ratio for the case of TM7 by simulations.

FIG. 3A shows a case where there is an interference wave (the number of interference wave is 1) and the movement speed of the wireless communication device 20 is 3 km/h. In a case where BLER is equal to 0.1, the CIR value about the AAS synthesis (the lower polygonal line) is smaller by 9.0 dB, i.e., it can be said that the CNR value is improved by 9.0 dB, as compared to the case where there is no AAS synthesis (the upper polygonal line).

Figure 3B:
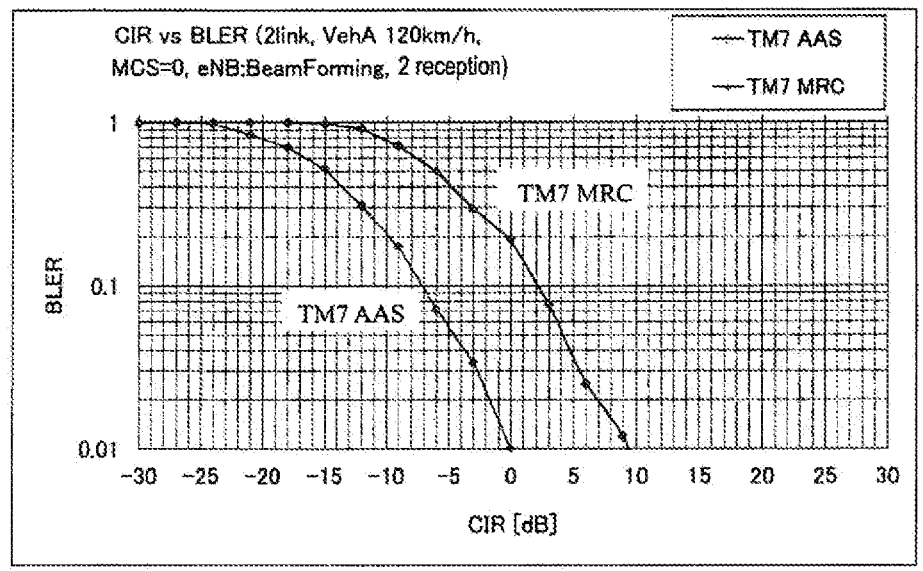

FIG. 3B shows a case where there is an interference wave (the number of interference wave is 1) and the movement speed of the wireless communication device 20 is 120 km/h. In a case where BLER is equal to 0.1, the CIR value about the AAS synthesis (the lower polygonal line) is smaller by 9.0 dB, i.e., it can be said that the CNR value is improved by 9.0 dB, as compared to the case where there is no AAS synthesis (the upper polygonal line).

According to the simulation results shown in FIG. 3, it can be said that the effect of the AAS synthesis is larger than the other TM, so that the effect of the AAS synthesis is kept even though the movement speed increases.

FIG. 4 shows a relation between a block error ratio and a carrier noise ratio for the case of TM2 by simulations.

In the TM2 (SFBC: Space Frequency Block Coding), the number of streams is two and the number of transmission antennas is four in the base station 10 of FIG. 1, and the SFBC processing is performed to transmit the signals from the four antennas. The wireless communication device 20 has the two antennas, receives the signals with the AAS, and performs the channel estimation, the channel equalization and the SFBC decoding by using the signals received with the AAS.

The logical antenna port 0 (12-a) and the logical antenna port 1 (12-b) are used, which is the same as the TM3.

The reception BLER (block error rate) is shown when the terminal reception CNR (dB) or CIR (dB) is changed.

Figure 4A:
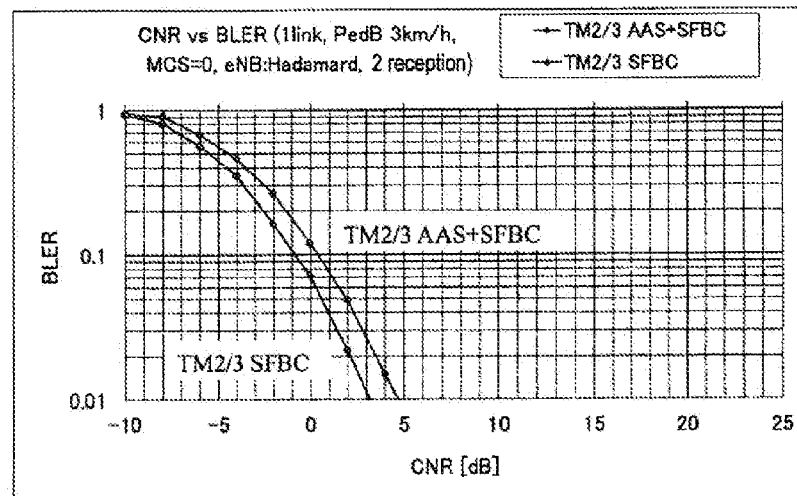
FIGS. 4A, 4B and 4C show relations between a block error ratio and a carrier noise ratio for the case of TM2 by simulations.

FIG. 4A shows a case where there is no interference wave (1 link) and the movement speed of the wireless communication device 20 is 3 km/h. In a case where BLER is equal to 0.1, the CNR value about the AAS synthesis (the lower polygonal line) is larger by 1.3 dB, i.e., it can be said that the CNR value is deteriorated by 1.3 dB, as compared to the case where there is no AAS synthesis (the upper polygonal line).

Figure 4B:
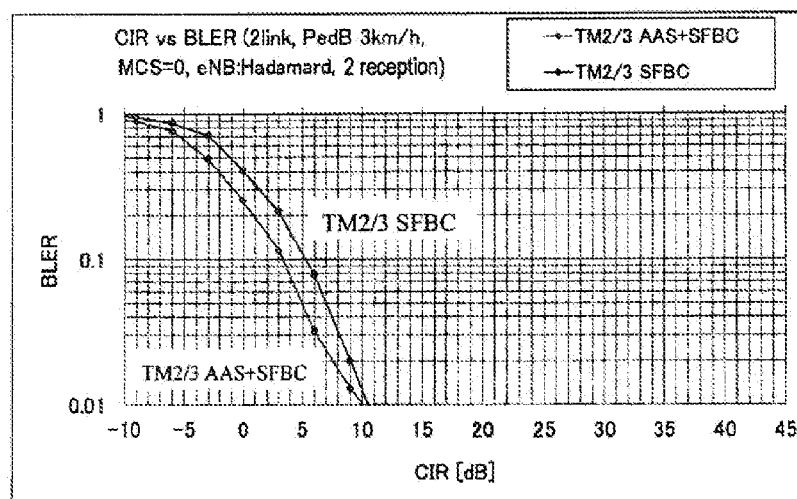

FIG. 4B shows a case where there is an interference wave (the number of interference wave is 1) and the movement speed of the wireless communication device 20 is 3 km/h. In a case where BLER is equal to 0.1, the CIR value about the AAS synthesis (the lower polygonal line) is smaller by 2.0 dB, i.e., it can be said that the CNR value is improved by 2.0 dB, as compared to the case where there is no AAS synthesis (the upper polygonal line).

Figure 4C:
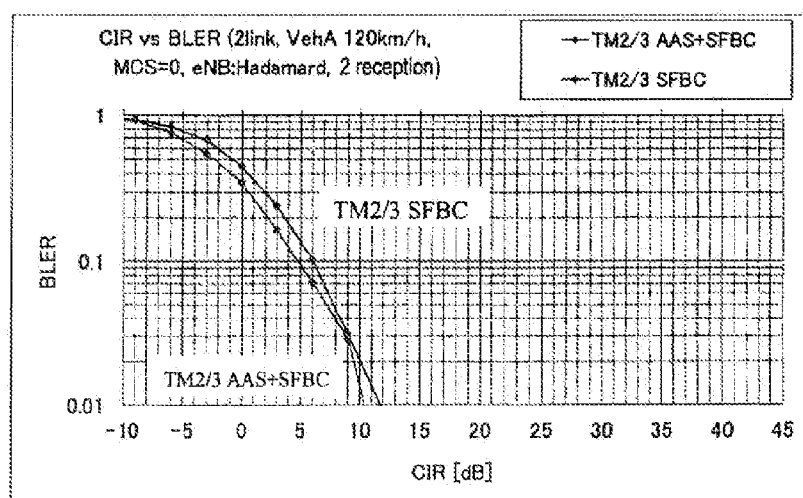

FIG. 4C shows a case where there is an interference wave (the number of interference wave is 1) and the movement speed of the wireless communication device 20 is 120 km/h. In a case where BLER is equal to 0.1, the CIR value about the AAS synthesis (the lower polygonal line) is smaller by 1.0 dB, i.e., it can be said that the CNR value is improved by 1.0 dB, as compared to the case where there is no AAS synthesis (the upper polygonal line).

According to the simulation results shown in FIG. 4, it can be said that the AAS synthesis causes the deterioration of the reception signal characteristic when there is no interference wave and that the effect of the AAS synthesis is decreased as the movement speed of the wireless communication device 20 increases.

A reason where the AAS does not work well in the SFBC is, in the SFBC, the transmission diversity where the orthogonal signal is multiplexed and transmitted is used and the MRC (maximum ratio combining) is originally assumed as regards the reception. Therefore, for 1 Link where there is no interference wave, it is appeared that the AAS synthesis is not preferable. Also, even with 2 Links (there is an interference wave), the effect is reduced, as compared to the other TMs.

A reason where the AAS does not work well at the high speed is, as described for the case of the TM3-Large Delay CDD, although Port 0 and Port 1 are used as the logical antenna ports, the positions of the reference signals are different in the ports, so that the AAS synthesis is applied. Therefore, it is considered to make the reference signals overlap with each other. However, it is appeared that the AAS synthesis is not preferable upon the high-speed movement.

FIG. 5 shows a relation between a block error ratio and a carrier noise ratio for the case of TM1 by simulations.

In the TM1, the number of streams is one and the number of transmission antennas is four in the base station 10 of FIG. 1, and the same data is received from the four transmission antennas. The wireless communication device 20 has the two reception antennas, receives the signals with the AAS, and performs the channel estimation and the channel equalization by using the signals received with the AAS. It is the one logical antenna port 0 (12-a) used in the TM7.

A lower polygonal line indicates a case where the AAS synthesis and the MMSE equalization are performed and an upper polygonal line indicates a case where the MRC synthesis is performed.

Figure 5A:
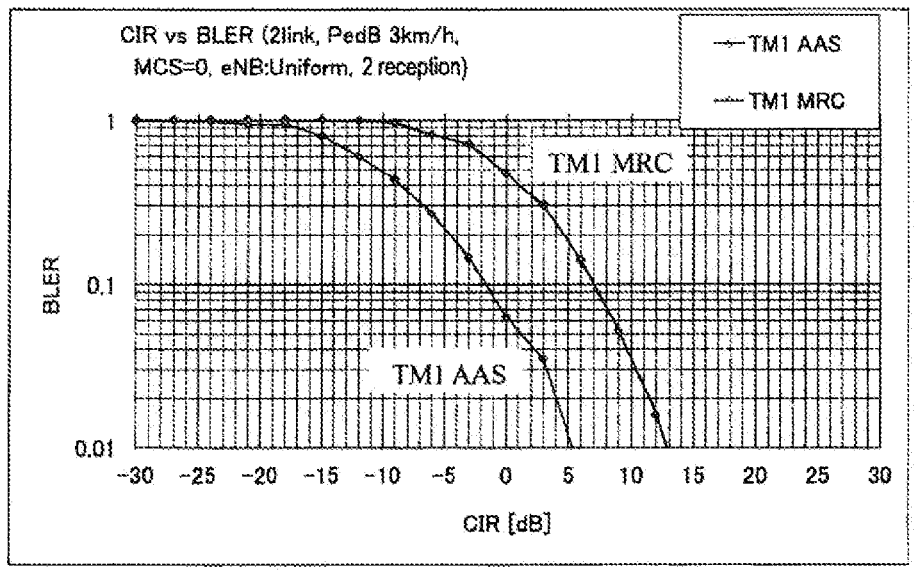
FIGS. 5A and 5B show relations between a block error ratio and a carrier noise ratio for the case of TM1 by simulations.

FIG. 5A shows a case where there is an interference wave (the number of interference wave is 1) and the movement speed of the wireless communication device 20 is 3 km/h. In a case where BLER is equal to 0.1, the CIR value about the AAS synthesis (the lower polygonal line) is smaller by 8.7 dB, i.e., it can be said that the CNR value of the ASS synthesis is improved by 8.7 dB, as compared to the MRC synthesis (the upper polygonal line).

Figure 5B:
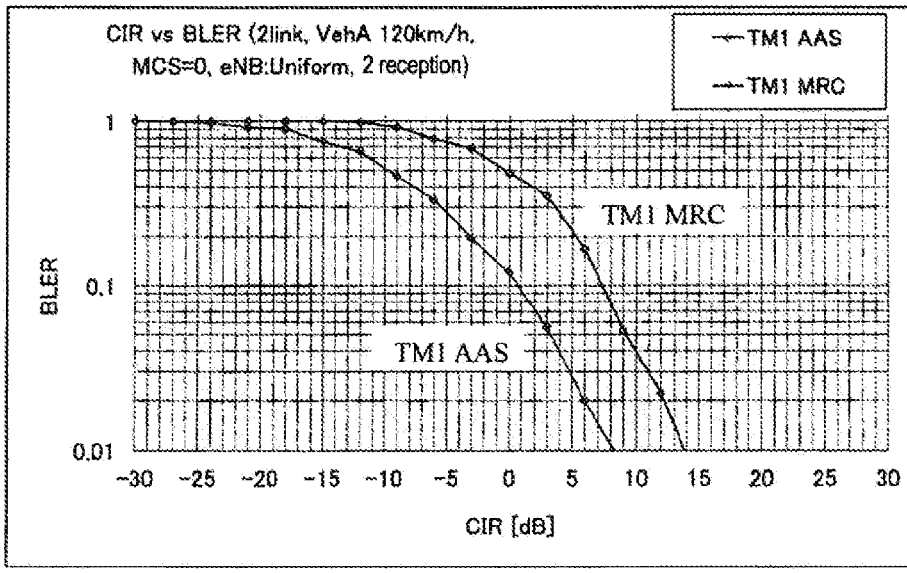

FIG. 5B shows a case where there is an interference wave (the number of interference wave is 1) and the movement speed of the wireless communication device 20 is 120 km/h. In a case where BLER is equal to 0.1, the CIR value about the AAS synthesis (the lower polygonal line) is smaller by 7.0 dB, i.e., it can be said that the CNR value of the ASS synthesis is improved by 7.0 dB, as compared to the MRC synthesis (the upper polygonal line).

According to the simulation results shown in FIG. 5, it can be said that the effect of the AAS synthesis is larger than the other TMs, similarly to the TM7, and the effect of the AAS synthesis is kept but is a little weakened even though the movement speed increases.

From the above simulation results and studies, followings can be mentioned.

1. In 1 Link where there is no interference wave, the reception signal characteristic may be deteriorated by the AAS synthesis or there may not be the effect of the AAS synthesis.

2. At high speed, the effect of the AAS synthesis may be lowered.

The above descriptions are not limited to the above-described examples and are effective for TM4, TM5, TM6, TM8 and the others.

Figure 6:
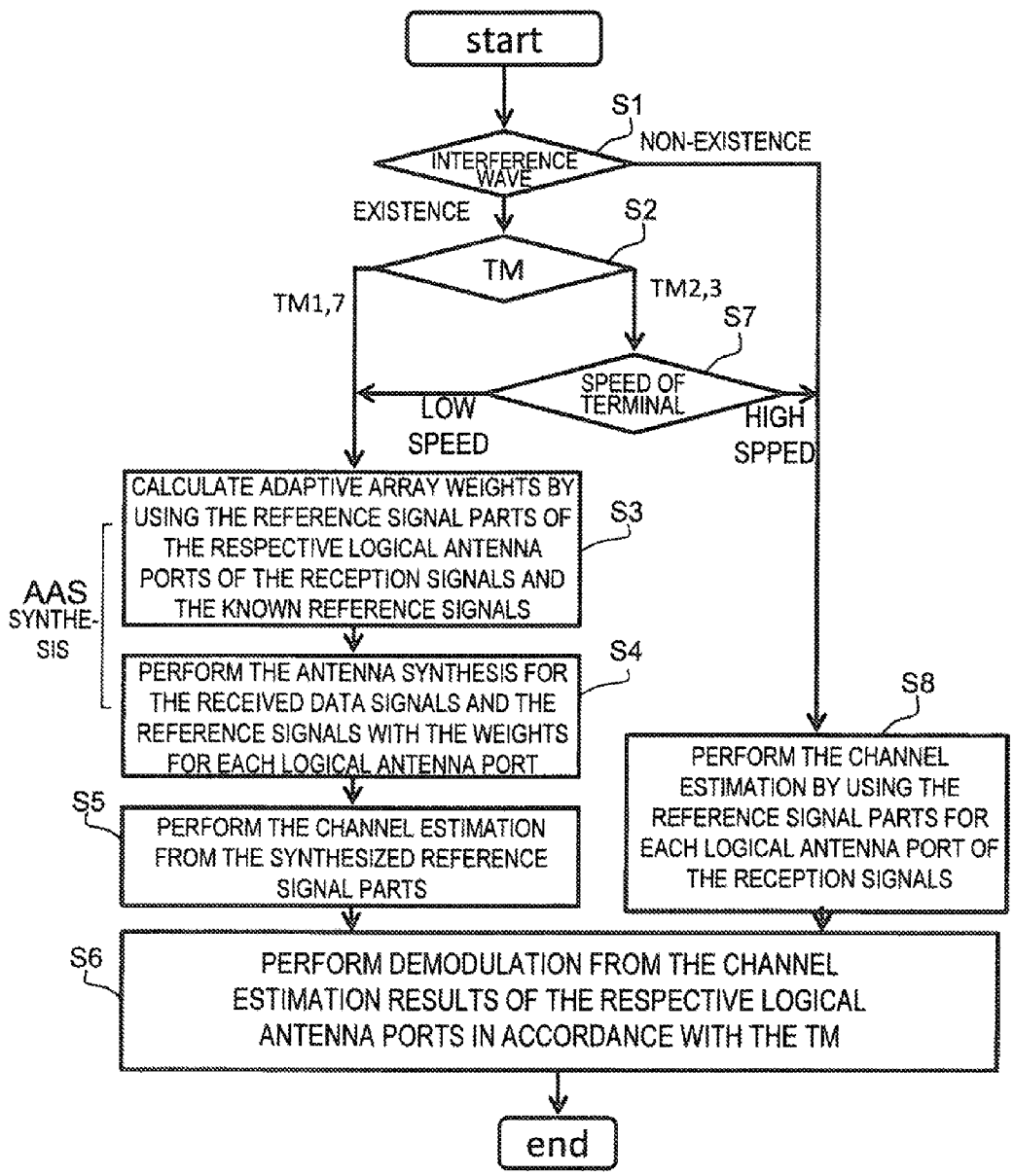
FIG. 6 is a flowchart of a wireless communication device according to an illustrative embodiment of the present invention.

FIG. 6 is a flowchart of the wireless communication device according to an illustrative embodiment of the present invention.

First, the interference wave detection unit 26 checks whether the interference wave of the reception signal is detected (step 1). When the interference wave is detected, the synthesis calculation unit 22 checks the TM (step 2). In the meantime, the interference wave detection unit 26 may determine whether there is the interference wave, based on the magnitude of the interference wave.

When the TM1 or TM7 is used, the synthesis calculation unit 22 determines to perform the AAS synthesis and calculates adaptive array weights by using the reference signal parts of the respective logical antenna ports of the reception signals and the known reference signals (step 3). The synthesis calculation unit 22 performs the antenna synthesis for the received data signals and the reference signals with the weights for each logical antenna port (step 4).

The channel estimation unit 23 performs the channel estimation from the synthesized reference signal parts(step 5). The MIMO decoding unit 24 performs demodulation from the channel estimation results of the respective logical antenna ports in accordance with the TM (step 6).

When the TM2 or TM3 is used, the movement speed detection unit 25 checks the movement speed of the wireless communication device 20 (step 7). When the movement speed is low, the processing proceeds to step 3. When the movement speed is high, the channel estimation unit 23 performs the channel estimation by using the reference signal parts for each logical antenna port of the reception signals (step 8) and the processing of step 6 is performed. For example, the low speed or high speed is determined by comparing the movement speed and a predetermined threshold value.

In this way, since the wireless communication device 20 determines whether or not to use the AAS method with taking into consideration the TM mode, existence or non-existence of the interference wave, the movement speed of the terminal and the like, and then operates, it is possible to further improve the reception signal characteristic.

In the illustrative embodiment of the present invention, since it is possible to perform the MIMO reception or SIMO reception while suppressing the interference wave from the other system with the AAS method, the reception signal characteristic is improved, as compared to the related art.

Also, in the illustrative embodiment of the present invention, the AAS method and the MIMO separation method such as the ZF method and the MMSE method are combined to improve the reception signal characteristic.

Also, in the illustrative embodiment of the present invention, the functions of detecting existence or non-existence of the interference signal from the other system and detecting the movement speed of the communication device are provided and the combination of the AAS method and the MIMO separation method such as the ZF method and the MMSE method can be selected. Therefore, the total reception signal characteristic corresponding to the wireless propagation environments is improved.

Although the present invention has been specifically descried with reference to the specific illustrative embodiment, it is apparent to one skilled in the art that a variety of changes or modifications can be made without departing from the spirit and scope of the invention.

The present application is based on the Japanese Patent Application No. 2012-007630 filed on Jan. 18, 2012, the contents thereof being here incorporated for reference.

DESCRIPTION OF THE REFERENCE NUMERALS

10: base station
11: MIMO coding unit
12: logical antenna port
13: adder
14: antenna
15: multiplier
20: wireless communication device
21: antenna
22: synthesis calculation unit
23: channel estimation unit
24: MIMO decoding unit
25: movement speed detection unit
26: interference wave detection unit

The invention claimed is:

1. A wireless communication device comprising:
a plurality of antennas receiving signals transmitted from one or more transmission antennas;
a synthesis calculation unit performing a synthesis calculation of respective reception signals received by the plurality of antennas and reception weights corresponding to respective antenna ports;
a channel estimation unit calculating respective estimated channel values from respective synthesized signals obtained by the synthesis calculation for the respective antenna ports;
a decoding unit performing decoding from the respective estimated channel values and the synthesized signals for the respective antenna ports; and
an interference wave detection unit detecting a magnitude of an interference wave of the reception signal;
wherein when the signal transmitted from the transmission antenna is a space frequency block coding (SFBC), the synthesis calculation unit does not perform the synthesis calculation if a level of the interference wave is a predetermined level or lower.

2. The wireless communication device according to claim 1,
wherein the reception signal comprises a reference signal, which is different for the respective antenna ports, respective reference signals being located at a frequentially-and-temporally same position, or the reception signal comprises a reference signal corresponding to one antenna port.

3. The wireless communication device according to claim 1, further comprising
a movement speed detection unit detecting a movement speed of the wireless communication device,
wherein the synthesis calculation unit performs the synthesis calculation, in response to the movement speed of the wireless communication device.

4. The wireless communication device according to claim 1,
wherein when the signal transmitted from the transmission antenna is a Large Delay CDD (Cyclic Delay Diversity) or SFBC, the synthesis calculation unit does not perform the synthesis calculation if the movement speed of the wireless communication device is a predetermined level or higher.

5. The wireless communication device according to claim 1,
wherein the reception signal comprises a reference signal, which is different for the respective antenna ports, and
wherein when respective reference signals is located at a frequentially-and-temporally different position, the synthesis calculation unit does not perform the synthesis calculation if the movement speed of the wireless communication device is a predetermined level or higher.

6. The wireless communication device according to claim 1,
   wherein the decoding is decoding using a MIMO method.

7. A wireless communication method comprising:
   performing a synthesis calculation of respective reception signals received by a plurality of antennas receiving signals transmitted from one or more transmission antennas and reception weights corresponding to respective antenna ports, according to a predetermined condition;
   calculating respective estimated channel values from respective synthesized signals obtained by the synthesis calculation for the respective antenna ports,
   performing decoding from the respective estimated channel values and the synthesized signals for the respective antenna ports;
   detecting a magnitude of an interference wave of the reception signal,
   wherein when the signal transmitted from the transmission antenna is a space frequency block coding (SFBC), the synthesis calculation is not performed if a level of the interference wave is a predetermined level or lower.

8. The wireless communication method according to claim 7,
   wherein the step of performing the synthesis calculation, the step of calculating the estimated channel values and the step of performing the decoding is performed in that order.

9. A wireless communication device comprising:
   a plurality of antennas receiving signals transmitted from one or more transmission antennas, and
   a controller,
   wherein the controller:
   performs a synthesis calculation of respective reception signals received by the plurality of antennas and reception weights corresponding to respective antenna ports;
   calculates respective estimated channel values from respective synthesized signals for the respective antenna ports;
   performs decoding from the respective estimated channel values and the synthesized signals for the respective antenna ports; and
   detects a magnitude of an interference wave of the reception signal,
   wherein when the signal transmitted from the transmission antenna is a space frequency block coding (SFBC), the synthesis calculation is not performed if a level of the interference wave is a predetermined level or lower.

* * * * *